(12) United States Patent
Stevens (10) Patent No.: US 10,161,576 B2
(45) Date of Patent: *Dec. 25, 2018

(54) FLASHLIGHT WITH BATTERY ADAPTER

(71) Applicant: Nathaniel D. Stevens, Chula Vista, CA (US)

(72) Inventor: Nathaniel D. Stevens, Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,139

(22) Filed: Jan. 30, 2018

(65) Prior Publication Data

US 2018/0156396 A1    Jun. 7, 2018

Related U.S. Application Data

(63) Continuation of application No. 15/269,754, filed on Sep. 19, 2016, now Pat. No. 9,879,833.

(60) Provisional application No. 62/220,135, filed on Sep. 17, 2015.

(51) Int. Cl.
*F21L 4/00*     (2006.01)
*H01M 2/10*    (2006.01)

(52) U.S. Cl.
CPC ........... *F21L 4/005* (2013.01); *H01M 2/1022* (2013.01)

(58) Field of Classification Search
CPC ....................................................... F21L 4/005
See application file for complete search history.

(56) References Cited

U.S. PATENT DOCUMENTS 9,879,833 B2 *    1/2018    Stevens ................... F21L 4/005

* cited by examiner

*Primary Examiner* — Mary Ellen Bowman
(74) *Attorney, Agent, or Firm* — GSS Law Group (57) ABSTRACT

An example apparatus embodiment includes a flashlight operable from a primary electric storage battery and from another battery having an external casing that has a different outer diameter and possibly a different overall length than the primary battery. In some embodiments, a battery adapter extends a battery compartment to hold a longer substitute battery. In other embodiments a batter adapter holds a battery with a dimension, for example a diameter of the battery case, that is too large to allow the battery to slide into the battery compartment. Another example embodiment includes a battery adapter without a flashlight.

10 Claims, 7 Drawing Sheets

SECTION A-A

Fig. 7

SECTION A' - A'

Fig. 8

SECTION B-B

Fig. 9A

SECTION B'-B'

SECTION A"-A"

Fig. 12

SECTION A''' - A'''

Fig. 13

FLASHLIGHT WITH BATTERY ADAPTER

FIELD OF THE INVENTION

Embodiments are related to handheld flashlights powered from one or more electric storage batteries held in a battery compartment within the flashlight.

BACKGROUND

A handheld flashlight may be powered by one or more electric storage batteries enclosed in a battery compartment inside the body of the flashlight. When the flashlight is turned on, electrical energy stored in the batteries is converted to light energy by a light emitter such as an incandescent bulb, light emitting diode (LED), or fluorescent bulb. The batteries, light emitter, and an electrical switch may be connected in a series electrical circuit. Some flashlights include an electrical circuit for dimming the light output from the flashlight or causing light to be emitted in a flashing pattern.

Some flashlights use high-capacity batteries such as lithium batteries, nickel metal hydride batteries, or other high-capacity battery technologies. High-capacity batteries may use a different battery casing to distinguish the batteries from zinc-carbon, alkaline, and rechargeable batteries.

A flashlight adapted to hold a lithium battery or other high-capacity battery may have a battery compartment that is the wrong internal diameter and possibly the wrong internal length for accepting another type of battery. If a battery of the correct size and shape is not available when the high-capacity battery needs to be replaced, the flashlight may be incapable of producing a useful amount of light until the correct replacement battery is located. It may be more difficult to obtain new high capacity batteries than carbon-zinc or alkaline batteries in remote areas, after normal business hours, or during an emergency.

SUMMARY

An example embodiment includes a flashlight body. The flashlight body includes a light emitter coupled to the flashlight body and a battery compartment formed as an internal cavity of the flashlight body. The battery compartment may be formed with an internal diameter sized for acceptance of a primary battery. A first contact surface may be formed at an end of the battery compartment.

The example embodiment further includes a battery adapter. The battery adapter includes a first end having a second contact surface coupled to the first contact surface of the battery compartment; a second end opposite the first end, the second end of the battery adapter formed with a third contact surface sized for coupling to the second contact surface; and an aperture passing through the first end and the second end of the battery adapter, the aperture formed with a diameter sized for a sliding fit of a substitute battery. The example embodiment further includes an end cap coupled to the second end of the battery adapter.

Another example embodiment includes a battery adapter for a flashlight body. The example battery adapter includes a first contact surface near a first end of the battery adapter, the first contact surface adapted for securely coupling to a corresponding contact surface on a flashlight body; a second contact surface at an end opposite the first end, the second contact surface adapted for securely coupling to the first contact surface on another of the battery adapter; and an aperture passing through the first end and the second end of said battery adapter. The aperture may be sized for a sliding fit of a substitute battery.

In some embodiments, the primary battery has a battery case with a larger diameter and/or a shorter length than the battery case of the substitute battery. In other embodiments, the primary battery has a smaller diameter and/or a longer length thn the battery case of the substitute battery.

DESCRIPTION

Some example embodiments include a flashlight operable from a primary battery retained with a battery compartment formed in the flashlight body and from a substitute battery retained in the battery compartment and slidably engaging with a battery adapter attached to an end of the flashlight body. Other example embodiments include a battery adapter having an aperture sized for a sliding fit of a substitute battery. Embodiments are advantageous for replacement of a primary battery with a substitute battery having a different diameter than the primary battery and possibly a different length than the primary battery.

A primary battery may be a high-capacity electric storage battery such as, but not limited to, a lithium battery, a nickel metal hydride battery, and a high capacity alkaline battery. Examples of a substitute battery include, but are not limited to, a zinc carbon battery, an alkaline battery, and a rechargeable battery. A new high-capacity battery stores more ampere-hours of electrical energy than a new zinc-carbon battery of comparable size.

Figure 1:
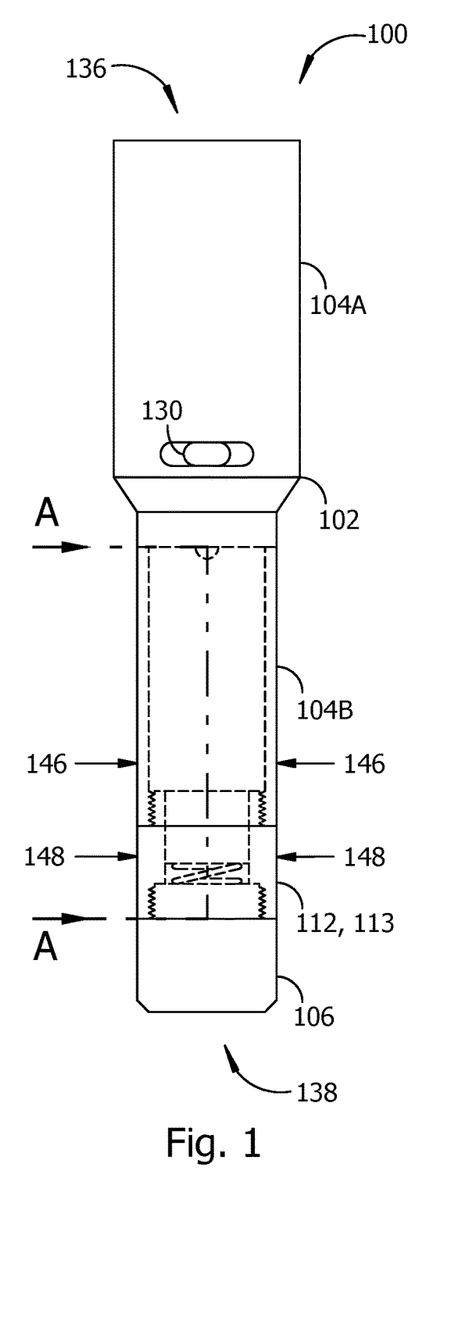
FIG. 1 shows a side view of an example apparatus embodiment including a flashlight with a removable battery adapter interposed between the flashlight body and the endcap.

FIG. 1 shows a side view of an example handheld flashlight embodiment. The example embodiment 100 includes a flashlight 102 having a body 104 coupled to an optional battery adapter 112 and an end cap 106. When the flashlight is turned on, possibly by operation of a power switch 130, light shines out of a first end 136 of the flashlight. In some embodiments, the flashlight may be turned on by rotation of a front segment 104A of the flashlight body relative to a back segment 104B. In some embodiments the front segment 104A is separable from the back segment 104B. The front segment 104A and back segment 104B may alternatively be formed as an integral unit.

Batteries are retained inside the battery compartment by the end cap 106 at a second end 138 of the body 104. When the flashlight is to be operated with a substitute battery, the battery adapter 112 is attached to the flashlight between the second end 138 of the body 104 and the end cap 106. The battery adapter may optionally have an outer dimension 148 that matches an outer dimension 146 of the body 104. In some embodiments, the battery adapter holds a substitute battery that has a larger diameter than the diameter of the primary battery and is therefore larger than the outer dimension of the flashlight body. When the body 104 is formed as a cylinder, the outer dimension 146 is a diameter of the cylinder. The body may alternatively be formed with a polygonal surface, for example one or more flat surfaces to prevent the flashlight from rolling when placed on another surface.

Figure 2:
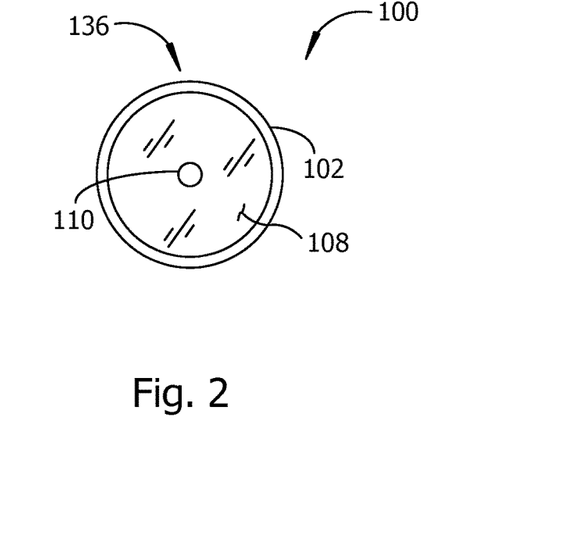
FIG. 2 shows a view toward a first end of the example flashlight of FIG. 1.
Figure 3:
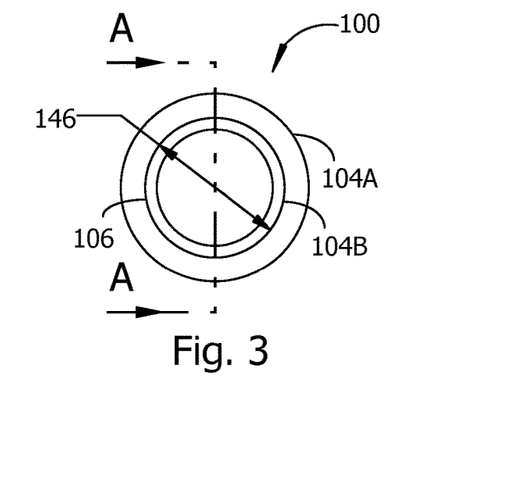
FIG. 3 shows a view toward a second end of the example flashlight of FIG. 1.

FIG. 2 shows an example view toward the first end 136. A light emitter 110 is visible behind an optional transparent window 108. FIG. 3 shows a view toward the end cap 106 at the second end 138 of the flashlight 102. In the example of FIG. 1, the end cap, battery adapter, and flashlight body couple to one another by the engagement of threaded contact surfaces. The contact surfaces may alternatively be adapted for a close sliding fit or a snap fit.

Figure 4:
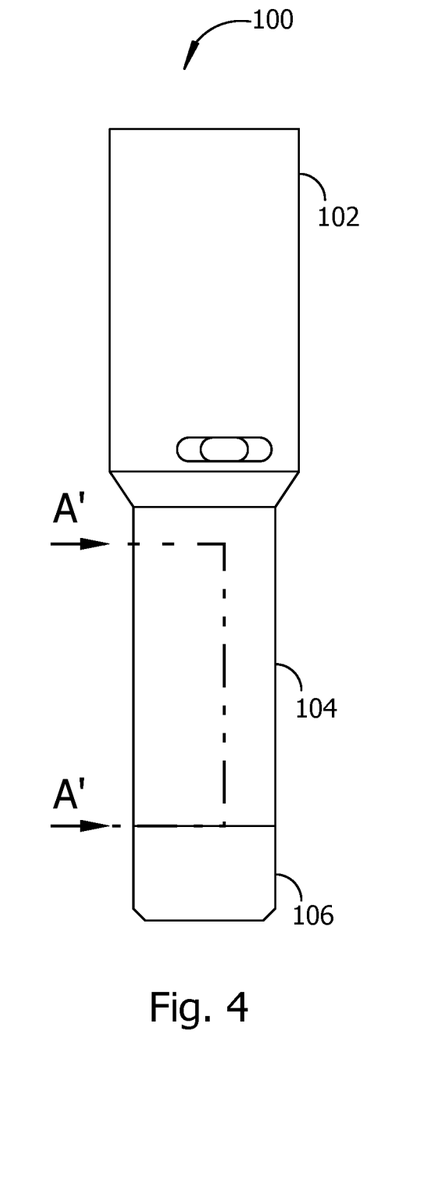
FIG. 4 shows a side view of the example embodiment of FIG. 1 with the example battery adapter removed.

FIG. 4 shows an example embodiment 100 arranged for operation with a primary battery. When the primary battery is being used to power the flashlight, the end cap 106 is attached directly to the body 104, and the battery adapter is omitted.

Figure 5:
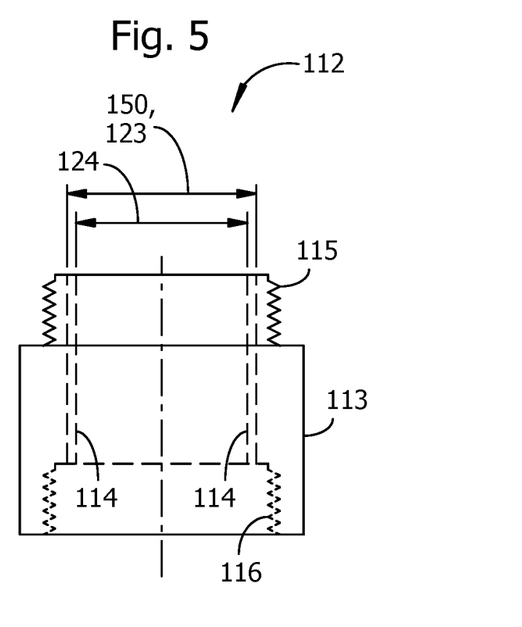
FIG. 5 is a side view of an example battery adapter.

FIG. 5 shows a side view of an example battery adapter 112 having an outer housing 113. In the example embodiment of FIG. 5, a first end of the battery adapter is formed with an external thread 115 selected to engage with a corresponding internal thread on the flashlight body and with the internal thread 116 on another battery adapter 112. An internal thread 116 is formed near the second end opposite the externally threaded end. An aperture passes through the battery adapter from the first end to the second end. In some embodiments, an optional hollow sleeve 114 has an inner diameter 124 that is slightly larger than the external diameter of a substitute battery, giving a sliding fit of the substitute battery. The hollow sleeve 114 may have an outer diameter 123 matching an inner diameter 150 of the battery compartment in the body 104 of the flashlight 102.

Figure 6:
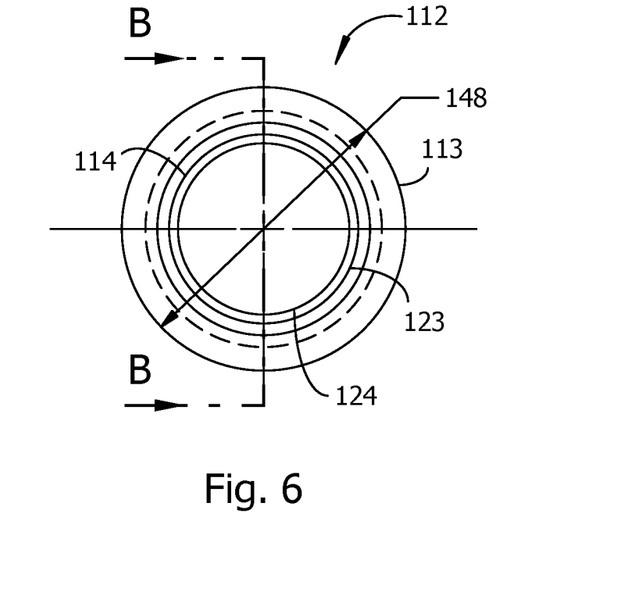
FIG. 6 is an end view of the example battery adapter of FIG. 5.

FIG. 6 shows a view toward the internally threaded end of the battery adapter example of FIG. 5.

Figure 7:
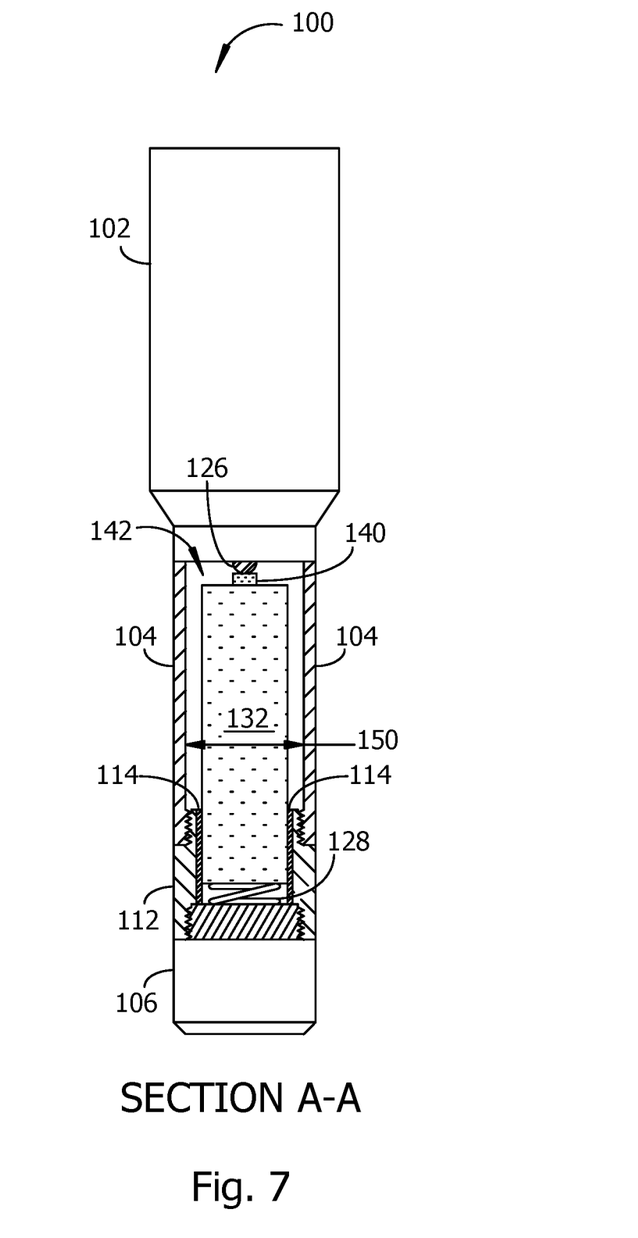
FIG. 7 is a cross-sectional view A-A of the example flashlight embodiment with the battery adapter interposed between the flashlight body back segment and the endcap, and further showing an example of a substitute battery in the battery compartment and battery adapter.

FIG. 7 is a cross section A-A representing an example of a substitute battery 132 in the battery compartment 142 of the flashlight body 104. The substitute battery 132 may slidably engage the hollow sleeve 114 in the battery adapter 112. The battery adapter holds the battery in position for a terminal 140 on the battery to make electrical contact with a battery contact terminal 126 in the body 104. The substitute battery 132 may be too long to be contained within the battery compartment 142. The battery adapter may extend the length of the battery compartment 142, with the substitute battery passing through the battery adapter to contact a battery terminal contact spring 128 attached to the end cap 106.

Figure 8:
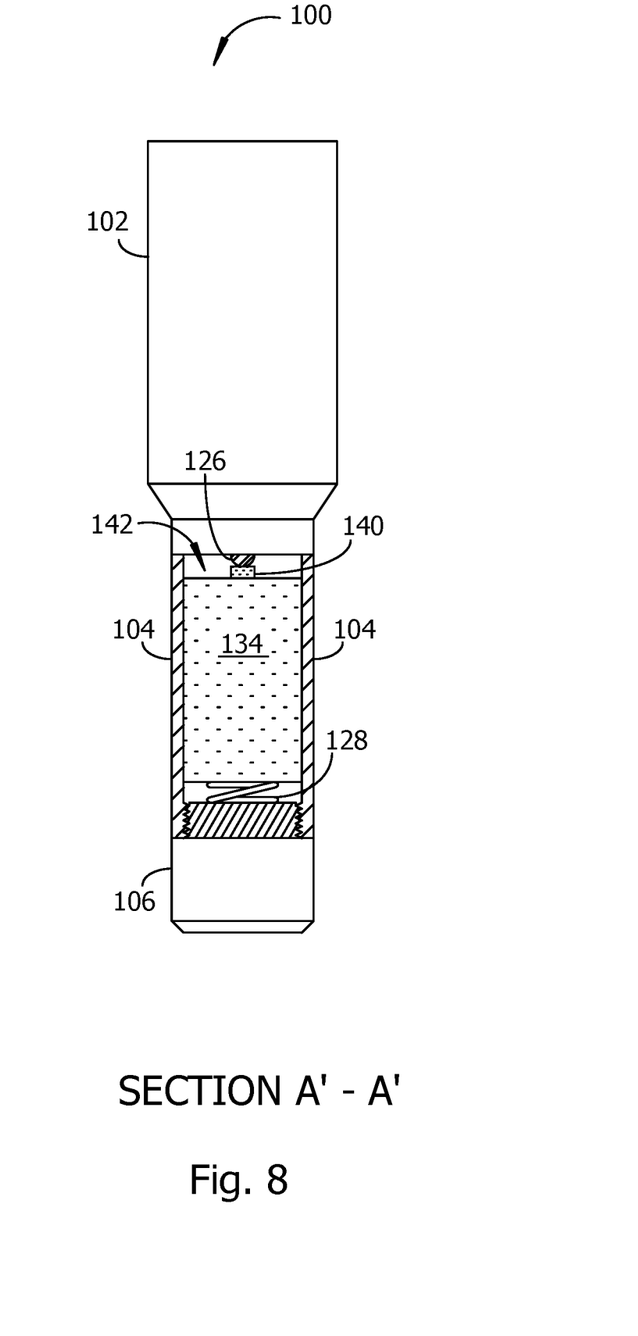
FIG. 8 is an alternative cross-sectional view A'-A' with the battery adapter removed and an example of a primary high-capacity battery enclosed within the battery compartment.

FIG. 8 shows an alternative cross sectional view A'-A' of the example flashlight embodiment 102. In the example of FIG. 8, a primary battery 134 slides into the battery compartment 142 with the terminal 140 on the battery in contact with the terminal 126 in the body 104. The end cap 106 is directly engaged with the body 104, the battery adapter having been omitted from the flashlight body.

Figure 9A:
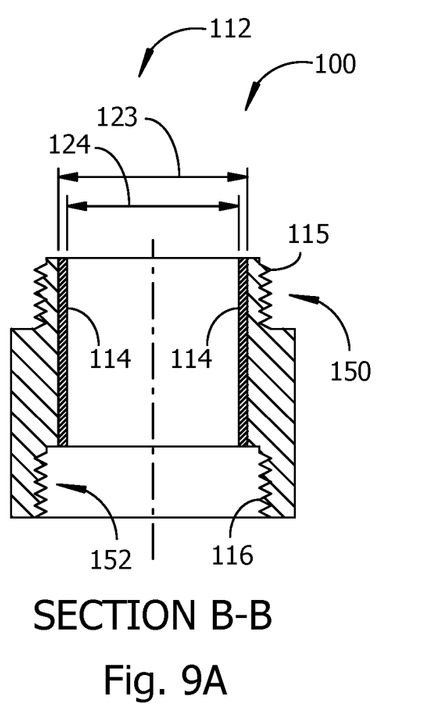
FIG. 9A is a cross-sectional view B-B of an example battery adapter having threaded contact surfaces.

FIG. 9A shows a cross-sectional view B-B of the example battery adapter 112 of FIG. 5 and FIG. 6. The internal diameter 124 of the hollow sleeve 114 fits closely into an aperture formed in the battery adapter 112. In some embodiments the sleeve is formed as an integral part of the battery adapter. The sleeve may alternatively be omitted and the internal aperture in the battery adapter formed with an aperture having a diameter 124 corresponding to the outer diameter of a substitute battery. An exterior contact surface 150 is adapted to couple to a corresponding interior contact surface 152 on another battery adapter or on a flashlight body.

Figure 9B:
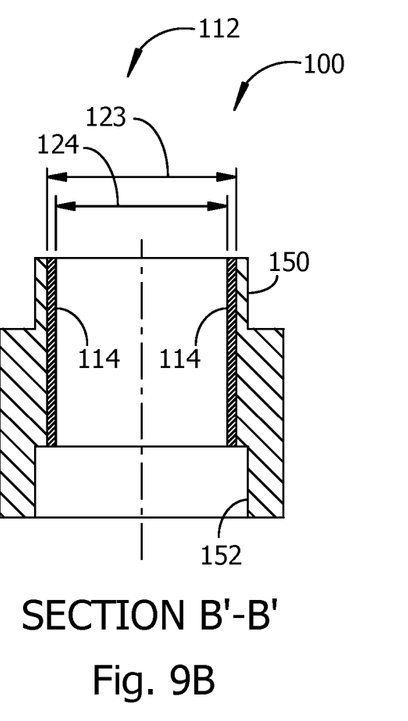
FIG. 9B is an alternative cross-sectional view B'-B' of an example battery adapter having contact surfaces sized for a close fit to corresponding contact surfaces on a flashlight body or on another battery adapter.

FIG. 9B shows an alternative cross-sectional view B'-B— having an exterior contact surface 150 and an interior contact surface 152 adapted for securely coupling with corresponding surfaces on another battery adapter or on a flashlight body. The secure coupling may be implemented as a close sliding fit between the surfaces or by a snap fit between joined parts.

Figure 10:
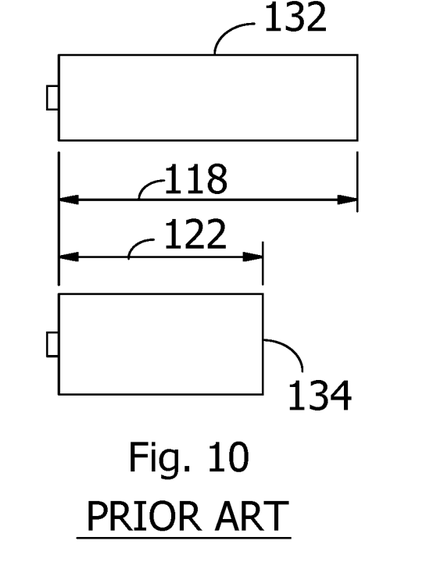
FIG. 10 is a side view of two example electric storage batteries compatible with the example embodiment of FIG. 1 (Prior Art).
Figure 11:
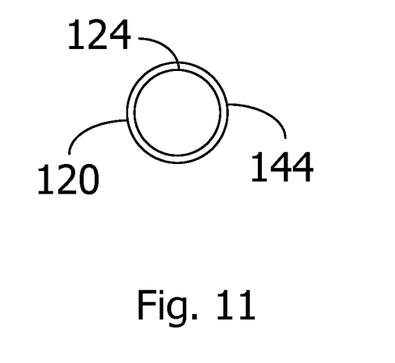
FIG. 11 is an end view of the two example batteries of FIG. 10, further illustrating an example internal diameter of the flashlight body in an example embodiment.

FIG. 10 shows an example of a comparison between a length 122 of a battery casing for a primary battery 134 and a length 118 of a battery casing for a substitute battery 132. FIG. 11 shows an example of a comparison between the diameter 120 of a battery casing for a primary battery and the diameter 124 of a battery casing for a substitute battery. The diameter 120 of the primary battery further represents a minimum inner diameter 144 of the battery compartment 142. In an example embodiment, the primary battery 134 has a casing size corresponding to a CR123 lithium battery and the substitute battery 132 has a casing size corresponding to an AA alkaline, zinc carbon, or rechargeable battery. In another example embodiment, the primary battery is a D size battery and the substitute battery is a C size battery. In another example embodiment, the primary battery size is CR123 and the substitute battery size is AAA. It will be appreciated that many other size combinations are within the scope of the disclosed embodiments, with the primary battery 134 generally having a different length and/or diameter than the substitute battery 132.

Figure 12:
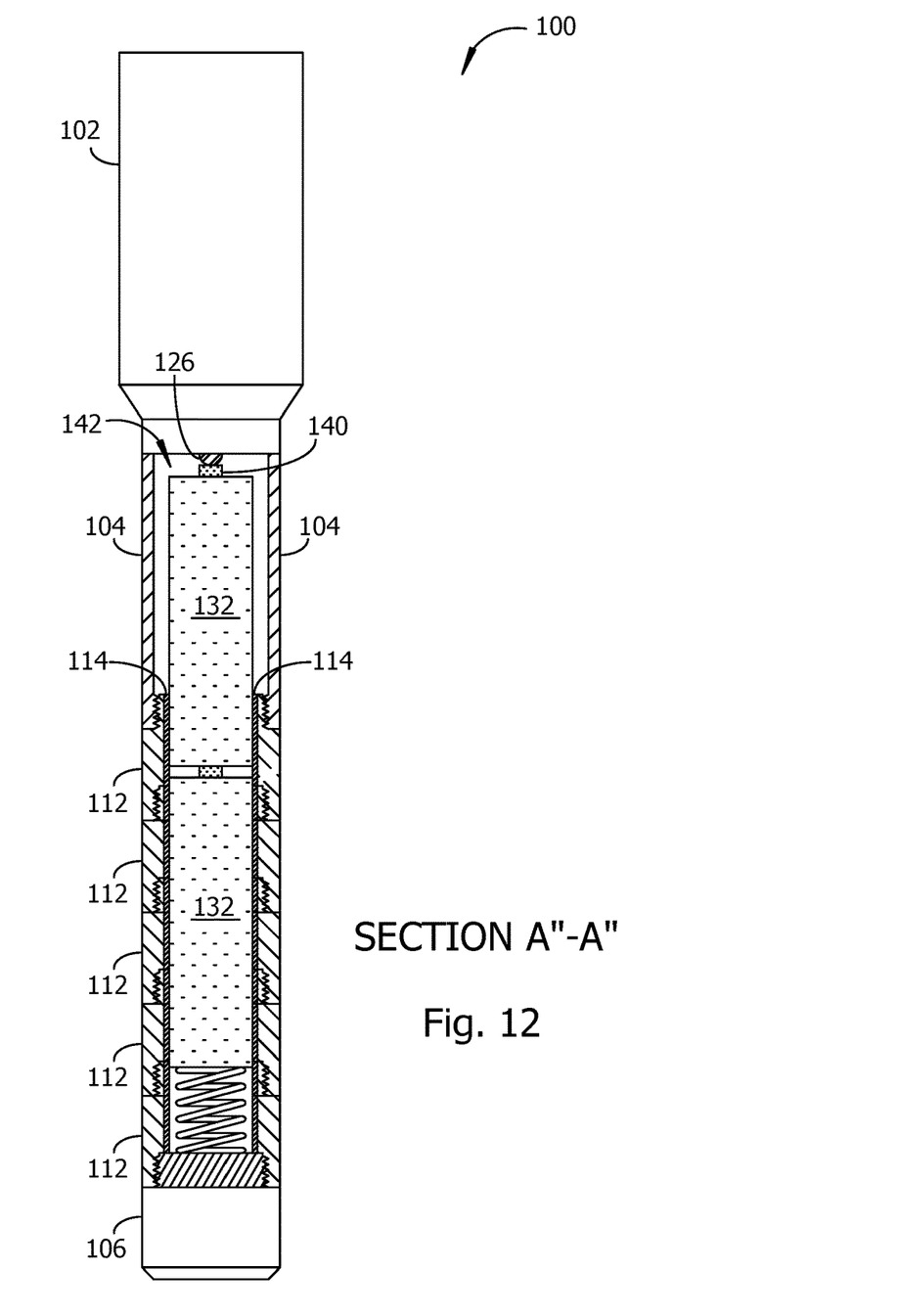
FIG. 12 is another alternative cross-sectional view A"-A" of an example flashlight embodiment with more than one battery adapter interposed between the flashlight body and the end cap and more than one substitute battery.

FIG. 12 shows another alternative cross-sectional view A"-A" in which more than one battery adapter 112 has been interposed between the body 104 and end cap 106. More than one battery adapter 112 may be used when more than one substitute battery 132 has been used to replace a primary battery.

Figure 13:
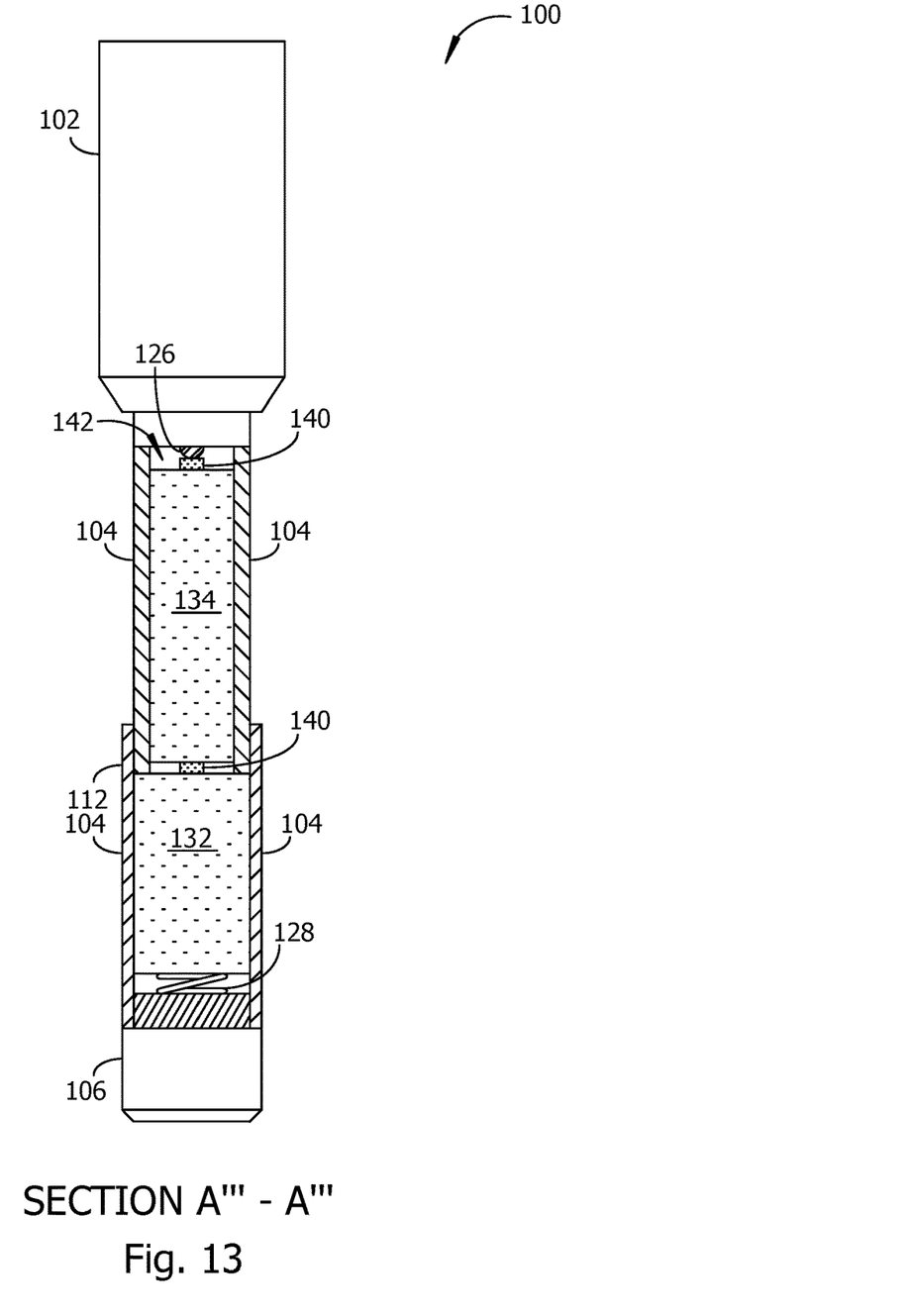
FIG. 13 is another alternative cross-sectional view A'"-A'" showing a battery adapter coupled to an outer surface of the flashlight body and an example primary battery that is longer and smaller diameter than the substitute battery held by the battery adapter.

FIG. 13 shows another alternative cross-sectional view A'''-A''' in which the primary battery 134 has a smaller diameter and a greater length than the substitute battery 132. The battery adapter may be arranged to couple to an exterior surface of the flashlight body as shown in the figure.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
   a battery adapter, comprising:
      a first end configured to attach to an end of a battery compartment in a flashlight body;
      a second end configured to attach to an end cap for the flashlight body; and
      an aperture passing through said first end and said second end of said battery adapter, said aperture formed with a diameter sized for receiving a substitute battery.

2. The apparatus of claim 1, wherein said first end is formed with an external thread configured to engage with an internal thread at the end of the battery compartment.

3. The apparatus of claim 1, wherein said first end is configured to engage with the flashlight body with a snap fit.

4. The apparatus of claim 1, said battery adapter further comprising a housing having an outer diameter matching an outside diameter of said flashlight body.

5. The apparatus of claim 1, said battery adapter further comprising a hollow sleeve having an inner diameter selected for a sliding fit of said substitute battery.

6. The apparatus of claim 5, wherein said hollow sleeve engages said battery adapter with a close sliding fit.

7. The apparatus of claim 5, wherein said hollow sleeve is integrally formed with said battery adapter.

8. The apparatus of claim 1, wherein said battery adapter comprises a first battery adapter, and further comprising a second battery adapter connected to said first battery adapter.

9. The apparatus of claim 1, said battery adapter further comprising a housing having an outer diameter matching an outside diameter of said flashlight body.

10. The apparatus of claim 5, wherein said hollow sleeve is formed with an inner diameter selected for a sliding fit of a primary battery.

* * * * *